United States Patent
Debiez et al.

(10) Patent No.: US 6,774,893 B2
(45) Date of Patent: Aug. 10, 2004

(54) INTELLIGENT LIGHT SOURCE

(75) Inventors: Jacques Debiez, Cugnaux (FR); Francois Lerat, Tournefeuille (FR)

(73) Assignee: Storage Technology Corporation, Louisville, CO (US)

( * ) Notice: Subject to any disclaimer, the term of this patent is extended or adjusted under 35 U.S.C. 154(b) by 3 days.

(21) Appl. No.: 10/234,591

(22) Filed: Sep. 4, 2002

(65) Prior Publication Data

US 2003/0001807 A1 Jan. 2, 2003

Related U.S. Application Data

(63) Continuation of application No. 09/532,603, filed on Mar. 22, 2000, now Pat. No. 6,473,062.

(51) Int. Cl.$^7$ ............................................... H61G 13/00
(52) U.S. Cl. .......................... 345/207; 345/46; 345/48; 345/63; 345/77; 345/84; 358/484; 362/227; 362/228; 362/231; 362/236; 362/240; 362/310
(58) Field of Search .............................. 345/46, 48, 63, 345/77, 84, 207; 358/484; 362/227, 228, 231, 236, 240, 310

(56) References Cited

U.S. PATENT DOCUMENTS

| | | | |
|---|---|---|---|
| 3,820,068 A | 6/1974 | McMillin | |
| 4,315,245 A | 2/1982 | Nakahara et al. | |
| 4,613,269 A | 9/1986 | Wilder et al. | |
| 4,743,773 A | 5/1988 | Katana et al. | |
| 4,983,817 A | 1/1991 | Dolash et al. | |
| 5,319,182 A | 6/1994 | Havens et al. | |
| 5,382,782 A | 1/1995 | Hasegawa et al. | |
| 5,420,410 A | 5/1995 | Bremer | |
| 6,178,014 B1 * | 1/2001 | Copenhaver et al. | 358/475 |
| 6,327,489 B1 | 12/2001 | Hoogenraad et al. | |
| 6,402,358 B1 * | 6/2002 | Larimer | 362/575 |
| 6,513,962 B1 * | 2/2003 | Mayshack et al. | 362/583 |

* cited by examiner

Primary Examiner—Bipin Shalwala
Assistant Examiner—Vincent E. Kovalick
(74) Attorney, Agent, or Firm—Wayne P. Bailey

(57) ABSTRACT

Disclosed is a intelligent light source that is capable of providing a uniform illumination image across the surface of an illuminated object analyzed by an optical detector. This is accomplished by individually controlling each light-emitting element of a linear array of light elements. Calibration of the array is accomplished by sequentially illuminating each optical element of the source and building an array of normalized detected data. The matrix is then inverted and multiplied by a linear array of ones to generate the calibration data. The calibration data are then used to program a simple logic device that allows accurate digital control of the intensity of each individual light element.

5 Claims, 11 Drawing Sheets

$$\begin{bmatrix} \tau_{o1} \\ \tau_{o2} \\ \tau_{o3} \\ \vdots \\ \vdots \\ \tau_{oN} \end{bmatrix} \longleftarrow 43$$

FIG. 7

$$I_{i,j} = \frac{V_{i,j}}{\tau_{oj} \times V_{Ref}} \longleftarrow 45$$

$$M = \begin{bmatrix} I_{1,1} & I_{2,1} & I_{3,1} & \cdots & \cdots & I_{N,1} \\ I_{1,2} & & & \cdots & \cdots & \\ I_{1,3} & & & \cdots & \cdots & \\ \vdots & \vdots & \vdots & \ddots & & \\ \vdots & \vdots & \vdots & & \ddots & \\ I_{1,N} & & & & & I_{N,N} \end{bmatrix} \sim 44$$

$$44 - [M] \times \begin{bmatrix} \tau_{c1} \\ \tau_{c2} \\ \tau_{c3} \\ \vdots \\ \vdots \\ \tau_{cN} \end{bmatrix} \overset{46}{=} \begin{bmatrix} 1 \\ 1 \\ 1 \\ \vdots \\ \vdots \\ 1 \end{bmatrix} \Big\} 48$$

FIG. 10

$$\begin{bmatrix} \tau_{c1} \\ \tau_{c2} \\ \tau_{c3} \\ \vdots \\ \vdots \\ \tau_{cN} \end{bmatrix} = [M]^{-1} \times \begin{bmatrix} 1 \\ 1 \\ 1 \\ \vdots \\ \vdots \\ 1 \end{bmatrix}$$

FIG. 11

INTELLIGENT LIGHT SOURCE

This is a continuation of application(s) Ser. No. 09/532,603 filed on Mar. 22, 2000, U.S. Pat No. 6,473,062, entitled INTELLIGENT LIGHT SOURCE.

BACKGROUND OF THE INVENTION

A. Field of the Invention

The present invention pertains generally to optics and more particularly to methods and apparatus for generating a uniform light source.

B. Description of the Background

Many different optical applications require the generation of light that has a uniform intensity over a predetermined spatial region. For example, a uniform source of light can be used to illuminate various objects for imaging or scanning applications. One specific example relates to the scanning of bar codes using an optical detector, usually a linear Charged Coupled Device (CCD) array.

A common way of illuminating targets such a bar codes for scanning purposes is to use a linear array of light emitting diodes (LED) or laser diodes, such as illustrated in FIG. 4. These sources of light, however, can vary greatly in intensity. For example, typical light emitting diodes can indiviually vary by as much as a factor of 4. To overcome this problem, selection processes are used to select LEDs that have substantially the same intensity output. However, these processes of selecting LEDs are expensive and substantially increase the cost of the resultant array. Though this method can be used, the forward current in each individual LED has to be accurate enough to obtain a uniform source.

Further, when mounting the LEDs in the array it is difficult to insure that each of the LEDs is aligned in a common direction. In the process of mounting these LEDs it is common for the LEDs to be slightly skewed or mounted off axis so that a uniform output is not provided. Techniques for insuring that each of these LEDs is properly aligned also substantially increases the cost of the LED array.

When illuminating a predetermined spatial region such as a bar code with a linear array, it is desirable to get a uniform signal at sensor output. Other problems exist in generating an intensity of light that gives an uniform signal at the output of the CCD such as lens vignetting, field attenuation that varies by the square of the distance along the length of the target, and even sensor sensitivity non-uniformity. These problems can be overcome, to some extent, by the use of compound lenses or other optics that are placed in front of the CCD sensor. However, compound lenses are expensive and normally cannot provide a complete correction of these problems unless they are custom designed for each individual application.

Further, light sources such as LEDs tend to age such that they produce a decreasing intensity over time. Initial calibration of an LED array will not necessarily result in a calibrated array after a period of time. Hence, the expensive calibration techniques that may be used to provide a uniform output intensity over a predetermined spatial region may be ineffective after a period of time especially since the individual sources of light may age differently. Other components in the system may also age which will also affect the ability to provide a source of light that is spatially uniform over a predetermined region.

It would therefore be desirable to have a system that is capable of calibrating the individual light source elements so that a uniform output can be achieved and therefore reduce the cost of the necessary optics and eliminate sorting procedures for selecting light elements having similar outputs. U.S. Pat. No. 5,382,782 issued Jan. 17, 1995 to Hasegawa et al. discloses a system for calibrating LEDs in an array. Hasegawa et al. discloses an iterative process of detecting and altering the output of an array in an attempt to provide a substantially uniform output. Adjustment of the elements is done by detecting where the luminance is higher and lower and then adjusting the LEDs in those particular areas. Some degree of uniformity can be achieved by repeating the process in an interative manner.

It would therefore be advantageous to provide a method of accurately adjusting the LEDs to provide a highly uniform output in a simple and easy fashion.

SUMMARY OF THE INVENTION

The present invention overcomes the disadvantages and limitations of the prior art by providing a method of calibrating an array of light sources to provide an accurate and uniform output light intensity over a predetermined spatial area.

The present invention may therefore comprise a method of calibrating an array of light sources to provide a substantially uniform output over a predetermined area comprising; sequentially activating each light source of the array of light sources; sampling light intensity over the predetermined area for each light source to generate a plurality of intensity signals; generating a normalized matrix of the plurality of intensity signals; inverting the matrix to produce an inverted matrix; calculating driver intensity data from the inverted matrix; using the driver intensity data to generate calibrated driver signals.

The advantages of the present invention are that a complete and accurate calibration of the light emitting diodes can be performed in a single step and in a very accurate manner that does not require multiple iterations. The response of the signal issubstantially uniformly flat at the CCD output, so the control of the light source compensates any defects from the power source to the CCD output, including the optical path. This includes:

1. Variations in LED efficiency, including relative LED efficiency versus forward current, peak current and angular displacement,
2. Variations in LED forward voltage,
3. Variations in analog parts driving the LEDs,
4. LED off-axis tilt,
5. Relative LED off-axis positioning,
6. Optical focusing systems transmission defects,
7. CCD sensitivity, and
8. CCD sensitivity resulting from non -uniformity.

Since only electrical parameters can be controlled and analyzed within the system, the calibration procedures act on the electrical power control of each individual LED to provide an accurate analysis of the CCD output signal.

Also, light emitting diodes do not have to be sorted to match diodes having similar outputs. Standard diodes can be used that have not gone through a sorting process. No fine-tuning of the analog discrete parts associated with the LED forward current setting has to be done either. Further, special aligning techniques do not have to be used for mounting the LEDs in a linear array. The LEDs can be mounted in accordance with the standard mounting procedures that-are accurate enough with respect to the calibration method used, and still be able to provide the desired uniform output. Further, expensive compound optics do not have to be used to generate a uniform output along the length of the target. By calibrating the system to adjust the intensities of the various light sources, expensive optical designs are not required. Additionally, even residual variations in the detected signal can be further adjusted by modulating the CCD array output signal with the inverse ripple signal that is used to adjust the sensitivity of the array. In this manner, a very accurate output can be produced, that gives the real reflectivity of the target which is analyzed, with a constant Signal to Noise Ratio across the field of view of the scanning device. This is required in most imaging applications.

BRIEF DESCRIPTION OF THE DRAWINGS

FIG. 7 schematically illustrates the initial pulse duration matrix.

FIG. 8 schematically illustrates normalization equation of the detected illumination.

FIG. 9 schematically illustrates a normalized detected intensity matrix.

FIG. 10 schematically illustrates a matrix product giving the uniform output level.

FIG. 11 illustrates a matrix multiplication for determining desired intensities in accordance with the present invention.

DETAILED DESCRIPTION OF THE INVENTION

Figure 1:
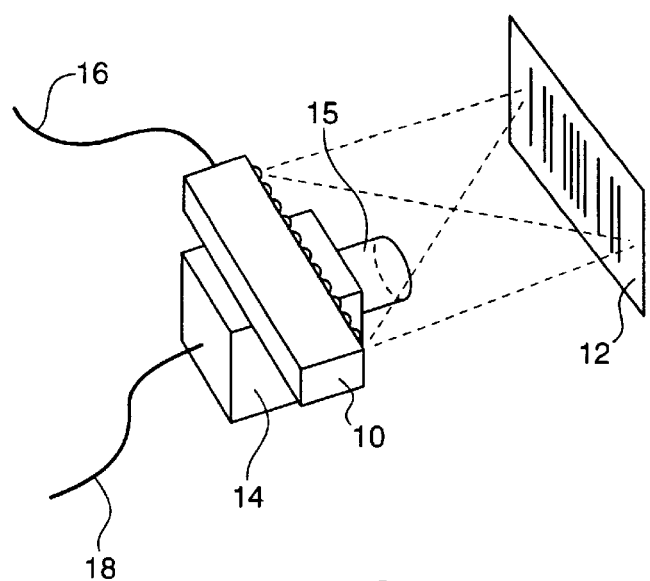
FIG. 1 schematically illustrates the manner in which a linear array of light sources can be used to illuminate a bar code that is imaged by a detector such as a CCD array.

FIG. 1 schematically illustrates the manner in which a linear array of optical elements 10 can be used to illuminate an object such as a bar code 12 for scanning by an image or scanning device, such as a linear CCD array 14. Typically, a single electrical power source 16 is used to provide power to the LEDs for illumination. The image information is generated by the imaging device 14 that may contain a linear array of CCD elements and is transmitted via connector 18. The linear array of optical elements 10 can comprise light emitting diodes, laser diodes or any desired sources of light. The object to be imaged, of course, can comprise any object that can be scanned or imaged. The present invention is not specifically limited to the scanning of bar codes. Similarly, the linear CCD array can comprise any detector elements including standard semi-conductor photo-detectors, photo-multiplier tubes or any similar type of detectors. The scanning or imaging device 14 may also include optics 15 for focusing of light from the object 12 being imaged. In accordance with the present invention, simple optics can be used, as disclosed below, to focus the object being scanned on the detector array, since the present invention provides a uniform response at the CCD output across the length of the object being scanned, such as a bar code 12. Additionally, in accordance with the present invention, a separate power control 16 is provided for each optical element of the linear array of LEDs. In this fashion, each optical element is separately controlled so that the intensity of each of these elements can be separately illuminated and corrected.

Figure 2:
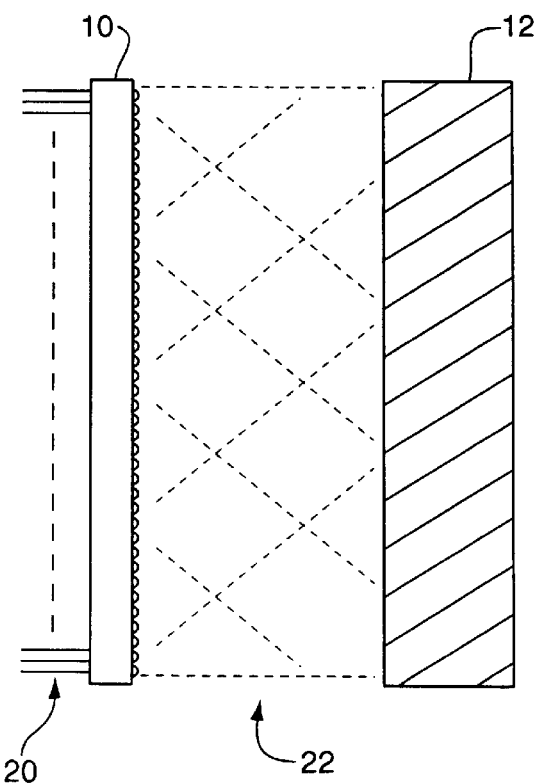
FIG. 2 is a side view illustrating the manner in which an LED array can illuminate an object to be scanned.

FIG. 2 schematically illustrates a side view of the manner in which a linear array 10 of optical elements, such as an LED array 10, is aligned to illuminate a scanned or imaged object 12. In accordance with the present invention, the luminous intensity of each of the N optical elements of the LED array 10 is calibrated so that a uniform signal is achieved at CCD output over the analyzed field of view. N is the number of LEDs, usually in the range 8 to 40 or more. Of course, the higher the number of LEDs, the flatter the response and the easier it is to control the source. The LEDs may be evenly or unevenly spaced. Usually they are evenly spaced, but in some applications (for example where the angle of view is very wide), it could be useful to reduce the LED spacing at the edges of the source. As a matter of convenience, the further description will assume evenly spaced elements.

Figure 3:
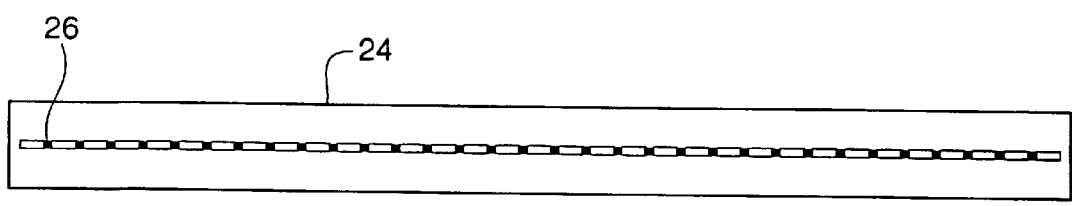
FIG. 3 schematically illustrates selected pixels within a CCD array.

In order to calibrate the LED array 10, it is necessary to analyze the image data generated during the scanning process of a specific reference white target. The target has to have a uniform reflectivity over the analyzed field of view and should be representative of the white level usually observed (i.e., the maximum reflectivity). In order to provide a suitable quantity of data to analyze, selected pixels from the CCD array 24 are used. As shown in FIG. 3, N selected pixel elements 26 that are evenly spaced along the linear array are selected for collection of data. A typical linear CCD array, for example, may include from 1024 to 6144 pixels. As shown in FIG. 3, N evenly spaced pixel elements are selected for collection of data. Alternatively, several pixel elements that are adjacent to each other or even multiple subsequent scan of the same pixels may be used and combined as a single element to reduce the effects of a single faulty element or of acquisition noise.

Figure 4:
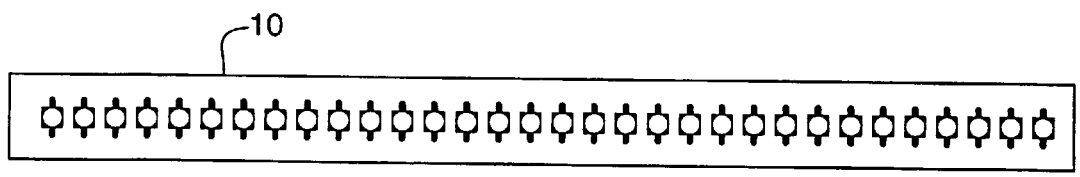
FIG. 4 is a front view of an LED array.

FIG. 4 is a schematic front view of an LED array 10, which has N equally spaced LEDs. Due to the magnification of the optical system or lens in front of the CCD, the LED array 10 has a different physical size than the CCD array 24, but each has equally spaced elements. As a matter of convenience, the same number of selected pixels 26 are used as the number of LED elements, so that a square matrix of data can be formed that is collected in accordance with the present invention.

Figure 5:
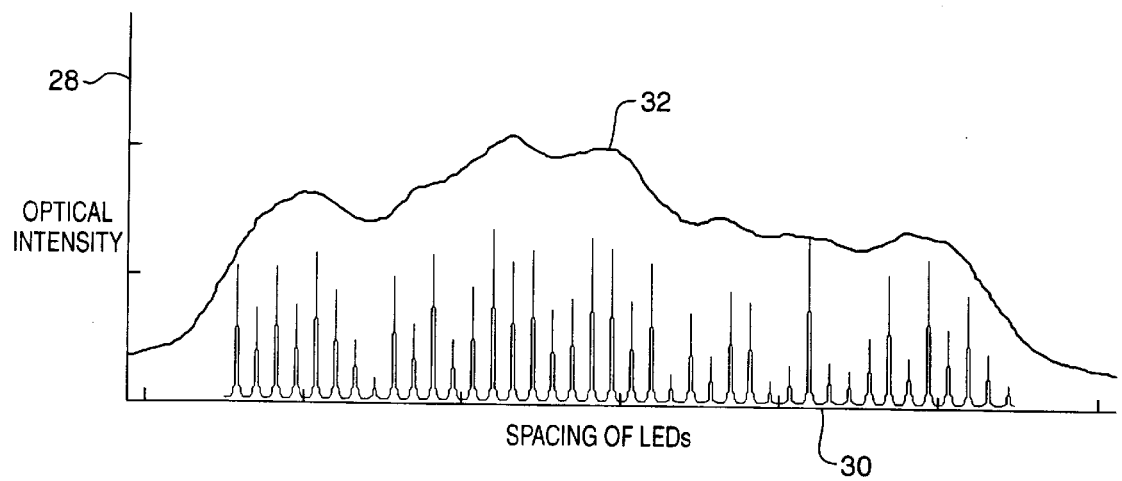
FIG. 5 is an output illustrating an exemplary output of an LED array.

FIG. 5 is a graph illustrating optical intensity versus the spacing 30 of the LEDs along the length of the LED array 10. The graph of FIG. 5 is aligned with each of the optical elements of the LED array of FIG. 4 for schematic purposes. As shown in FIG. 5, the output of each of the LEDs is illustrated as plot 28. The outputs can vary by as much as by a factor of 4. The optical intensity at the surface of the object being illuminated, such as object 12 in FIG. 2, is shown in plot 32. As is apparent from plot 32, the illumination of the surface of the object varies greatly with the distance along the object. In this manner, a very non-uniform illumination occurs along the image of the object 12 as a result of a combination of distance attenuation, lens vignetting and variations in sensitivity of the CCD picture elements.

Figure 6:
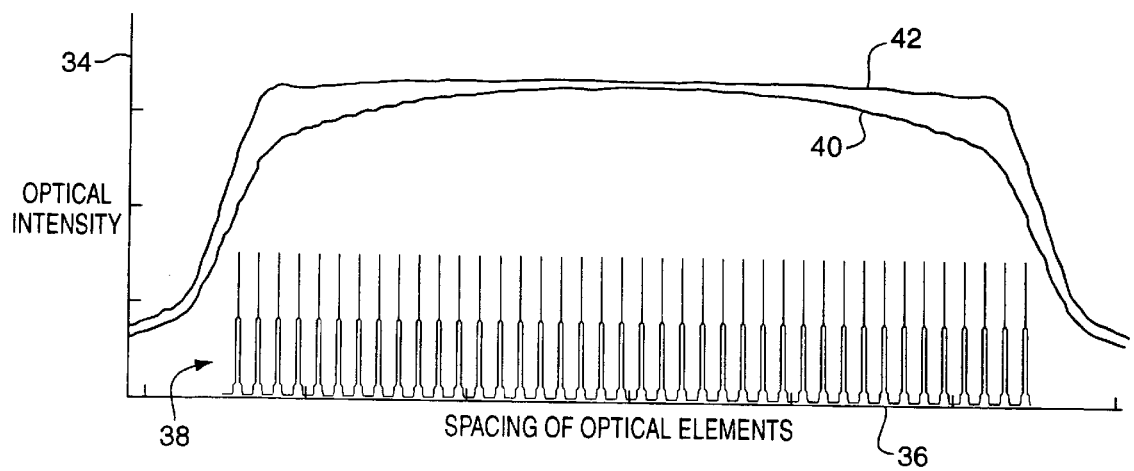
FIG. 6 illustrates a uniform output of an LED array and the resultant illuminated signal.

FIG. 6 is a plot of optical intensity 34 versus spacing 36 of optical elements such as LEDs. Plot 38 is a plot of the individual intensities of each of the LEDs. As can be seen from FIG. 6, each of the LEDs has a uniform output. When the LEDs have a uniform output as shown in FIG. 6, the light intensity along the surface of the object being illuminated when imaged, using simple optics, is shown in plot 40. As can be seen, contribution of light rays cause the intensity output to be greater towards the middle of the array. Hence, even assuming that each of the LEDs could be perfectly aligned and provide an equal output, the intensity of the light on the surface of the illuminated object, when imaged using simple optics, would still be non-uniform as shown by plot 40. As shown by plot 42, the use of compound optics can correct some of these non-uniformity problems, assuming that the LED source is perfectly homogeneous. As can be seen from the graphs from FIG. 5 and FIG. 6, individual control of the output of each of the optical elements, in accordance with the present invention, may provide the ability to correct the non-uniformities that are illustrated in FIG. 5 and FIG. 6.

Although individual control of elements or groups of elements has been disclosed in U.S. Pat. No. 5,382,782 issued to Hasegawa et al., a comprehensive and accurate technique for determining how to adjust each of the optical elements has not been disclosed. Trial and error techniques of calibration have resulted in multiple iterations with imperfect results. In addition, the complexity of the implementation and the processing horsepower needed to control one LED limits the number of LEDs individually driven and requires LED grouping.

In contrast, the present invention uses a calibration technique for adjusting each of the individual elements to provide highly accurate results in a single step, and allows easy implementation in inexpensive logic devices with capabilities to individually control a high count of LEDs without using processor horsepower for normal operation. These techniques are illustrated in FIG. 7 through FIG. 11. A typical implementation is described in FIG. 12 through FIG. 16.

The first step of the calibration process, in accordance with the present invention, is illustrated in FIG. 7. The LED array is aligned with a reference calibration area, usually an uniform white target. The usual way of modulating the light intensity is to drive the LED current. The preferred method to control this current digitally is to pulse a high current in the LED during a controlled amount of time. To make it compatible with the CCD acquisition, the pulse can be synchronized with the CCD charge transfer signal, by using the scan synchronization signal for the linear CCD. Since each LED is controlled individually, the control is characterized by the matrix 43, where $\sigma_{01}$ is the pulse duration for LED 1, and $\tau_{ON}$ is the pulse duration for LED N.

For the first calibration, since no assumption can be made, the pulse duration can be fixed to a given value To for every LED so that $\tau_0 = \tau_{01} = \tau_{02} \ldots = \tau_{ON}$ to form the initial pulse duration matrix 43. For the subsequent calibrations, the values in use from the latest calibration can be used, giving even more accurate results since these values are closer to the final computed value. The method of controlling the light intensity is not limited to the pulsewidth modulation technique described above. Any method where the light intensity is proportional to one controllable parameter is usable. As a matter of convenience, pulsewidth modulation will be used hereafter for the description of the method used. For example, current intensity may altentatively be used to obtain similar results.

In accordance with the calibration technique of the present invention, each individual optical element of the optical array is sequentially pulsed-on and CCD output data collected. For example the first LED is pulsed-on alone during $\tau_{01}$. The CCD array then images the white calibration area and samples are taken at N equally spaced CCD elements along the array as shown in FIG. 3. Each of these data points is normalized using equation 45 with i=1, where $V_{ij}$ is the value measured at the output of the CCD, $\tau_{oi}$ is the parameter controlling the intensity, and $V_{Ref}$ the desired constant value at the CCD output over the useful field of view. $I_{1j}$ is then recorded and forms the first column of the matrix illustrated in FIG. 9. For example, the first selected pixel corresponds to the intensity $I_{1,1}$ while the last pixel corresponds to $I_{1,N}$. Then, the first LED is turned off and the second LED is pulsed on during $\tau_{02}$. Each of the selected pixels then detects the intensity of the light along the white calibration area and these data points are normalized then stored as the second column in the matrix. This process continues until a square N by N normalized intensity matrix 44 is developed as shown in FIG. 9 by sequentially turning on each of the LEDs and sampling the data reflected from the white calibration area.

Once the normalized intensity matrix 44 is established as shown in FIG. 9, an equation can be written such as shown in FIG. 10. If the normalized intensity matrix 44 is multiplied by the corrected LED intensity control matrix 46, this matrix multiplication can be made equal to a unity matrix 48, so that the detected signal at the output of the CCD is uniform. In other words, the corrected intensity control matrix 46 is a linear matrix that when multiplied by the normalized intensity matrix 44 generates a unity matrix 48. Since the unity matrix 48 represents the signal that is actually detected by the CCD array for the N selected samples, which includes the optical elements of the system and any deviations in the CCD array, by setting the unity matrix at 1, the detected light intensity across the surface of the illuminated reference white target, as it is sensed by the CCD array, is uniform and measured as $V_{Ref}$. Additionally, by varying the values in the matrix 48 with values different from the unity matrix, allows the formation of a beam that can be moved and controlled across the surface of the target. Of course, the corrected intensity control matrix 46 is representative of the individual values at which each of the LED optical elements should be set to produce the unity matrix 48 when multiplied by the normalized detected intensity matrix 44.

As shown in FIG. 11, the equation can be solved for the corrected intensity control matrix 46 by inverting the normalized detected intensity matrix 44 and multiplying the inverted normalized detected intensity matrix 44 by the unity matrix 48. In this manner, each of the individual parameter controlling the intensity values for the optical elements, i.e., $\tau_{Ci}$, can be directly calculated for the LED array 10 in one deterministic step.

Figure 12:
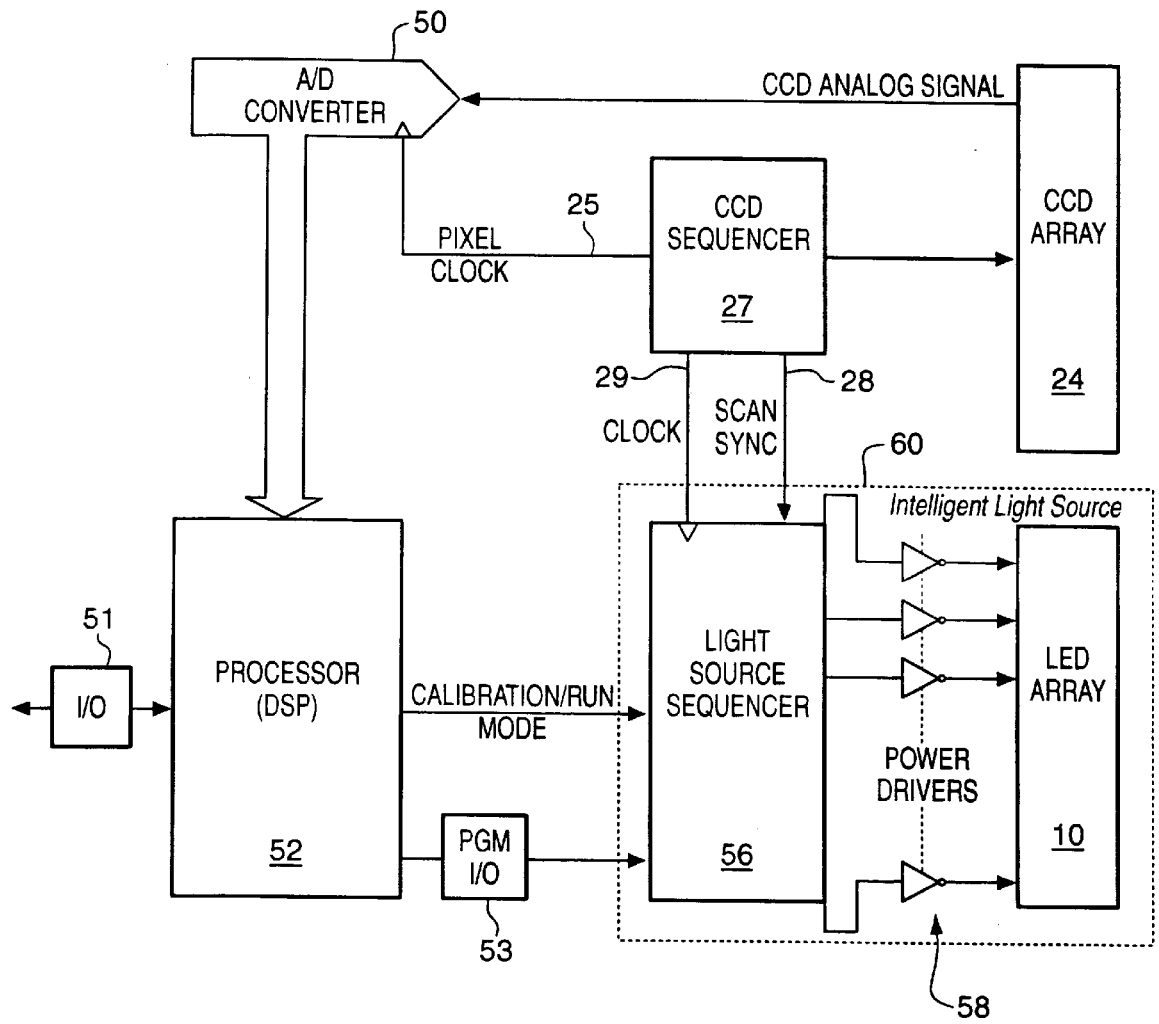
FIG. 12 is a schematic block diagram illustrating primary components of the present invention.
Figure 13:
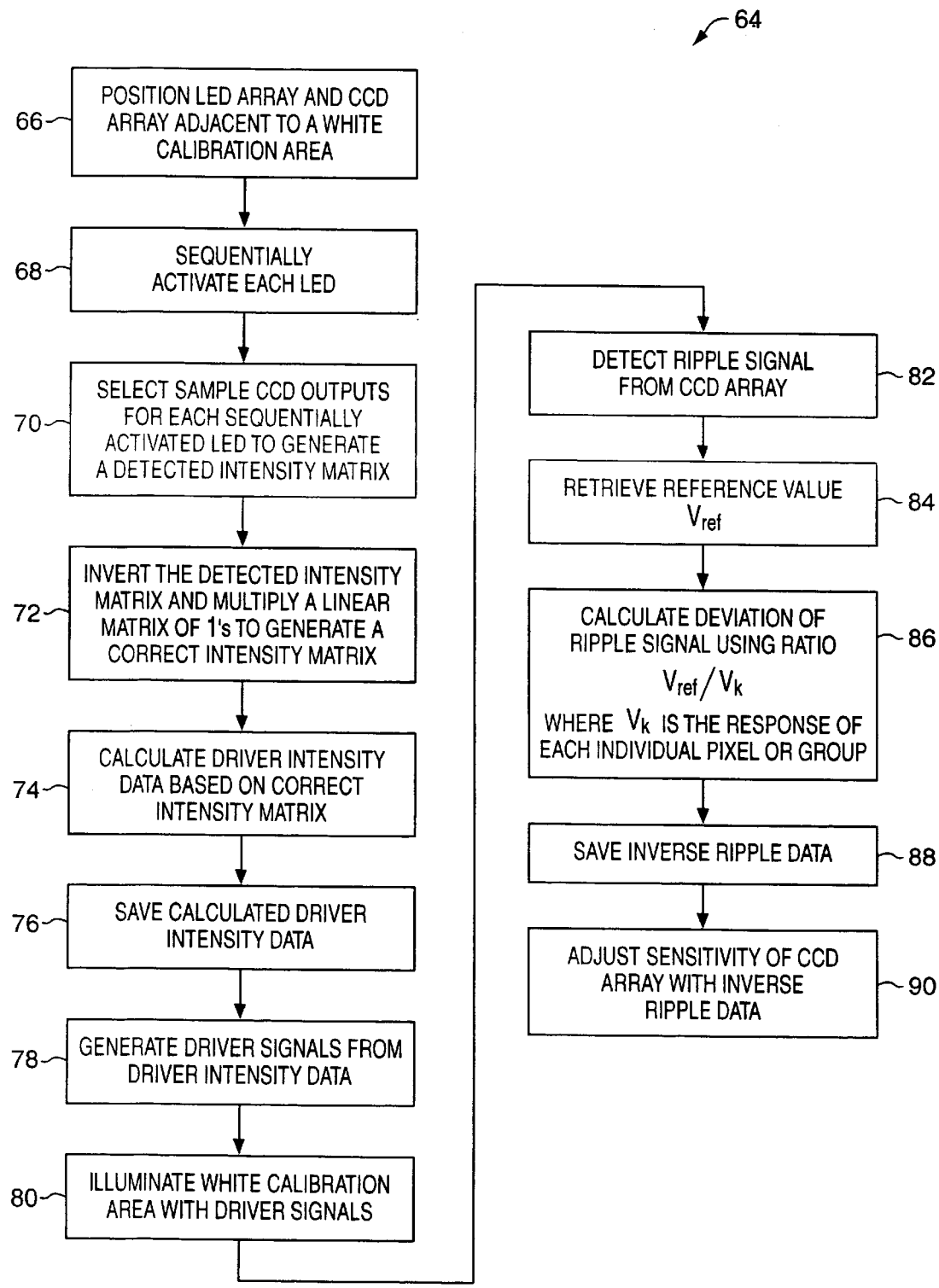
FIG. 13 is a flow diagram illustrating the manner of calibration used in accordance with the present invention.
Figure 14:
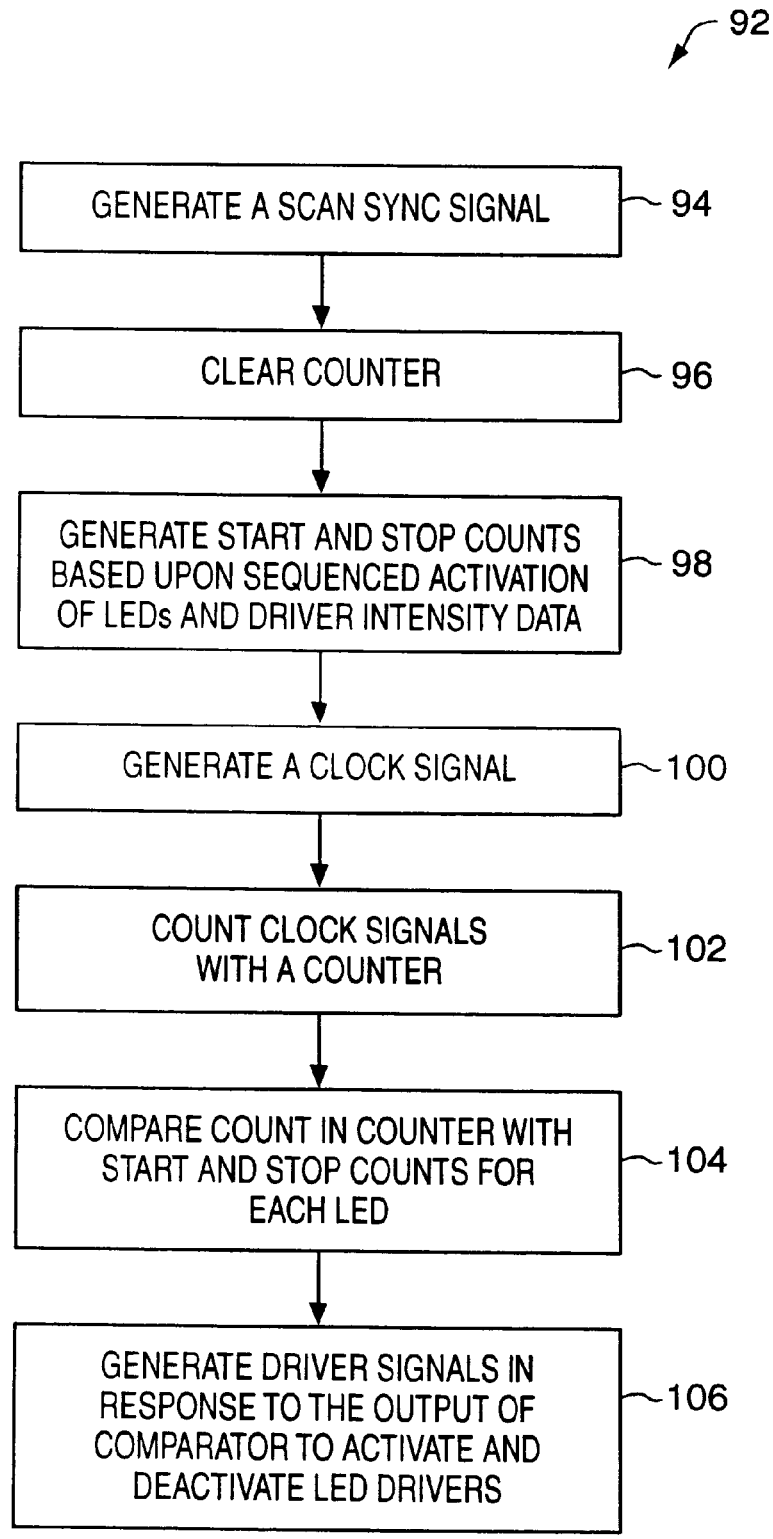
FIG. 14 is a flow diagram of the operational steps for illuminationg a target in accordance with the present invention.

FIG. 12 is a schematic block diagram of the device for carrying out the present invention. As shown in FIG. 12, the LED array 10 generates light that is reflected off an object and detected by CCD array 24. CCD array 24 is usually controlled by a CCD sequencer 27, which provides all of the clocks and synchronization signals for the CCD and the system. CCD array 24 generates an analog signal that is applied to an analog to digital converter 50 that samples the signal synchronously at the pixel rate 25. The digital signal that is representative of the detected intensity of the light that is imaged from the illuminated object is applied to a digital signal processor (DSP), micro-controller or microprocessor that usually processes the images acquired, hereinafter referred to as processor 52. Processor 52 has the necessary memory resources, I/O and computing capabilities to handle the interface and algorithms described herein. The digitizing performed by ADC 50 and the processing performed by processor 52 can be deported to separate calibration or processing equipment, if the system does not require standalone calibration or sophisticated processing. The processor 52 controls all of the calibration steps as described herein. The values of the corrected intensity matrix 46 are calculated in processor 52. These values are then converted per FIG. 14 and loaded in the programmable light source sequencer 56. The light source sequencer is a logic device that has:

either ISP (In Situ Programming) capability, such as a CPLD (Complex Programmable Logic Device), or FPGA (Field Programmable Gate Array) using Flash, $E^2$ or RAM based technology, or any equivalent capability that allows full programming of a individual pulse width control on many outputs, to perform the process steps as described in FIGS. 13 and 14. Usually, these programmable devices have a simple, three or four wire serial programming interface 51, such as JTAG (IEEE-1149). The Programming I/O interface 53 between the processor 52 and the light source sequencer 56 could be a simple I/O port, usually embedded in the micro-controllers or DSP. The sequencer 56 generates the driver signals, as described in the calibration cycle with regard to FIG. 13, and the run cycle with regard to FIG. 14.

FIG. 13 illustrates the calibration steps 64 that are carried out by the apparatus of the present invention. At step 66, the system positions the LED array and the CCD array adjacent a reference white calibration area for calibrating the LED array. At step 68 each LED is sequentially activated one by one, using the previous or a standard driver intensity control. At step 70 data from a selected sample of pixels is detected and corrected to generate a normalized detected intensity matrix 44. As indicated above, N pixels that are evenly spaced along the LED array are selected for collection of data. As also indicated above, these can comprise pixel pairs, pixel triplets or even multiple scans of the said pixels to minimize the effect of sensitivity of any individual pixel element, or acquisition noise.

At step 72 of FIG. 13, the normalized detected intensity matrix is inverted and multiplied by a linear matrix of ones to generate a corrected intensity control matrix 46. Each of these steps is performed by the processor 52. The new calculated driver intensity control data is then used to program the sequencer at step 76, which is programmed through a programming I/O interface 53. The sequencer 56 then generates driver signals from the driver intensity control data at step 78, simultaneously for all the LEDs. The driver signals are applied to power drivers 58 and the LED array 10 is activated to illuminate the white calibration area at step 80.

At this point, a separate calibration can be performed on the system. Referring again to FIG. 13, the CCD array detects the signal from the white calibration area, at step 80, which is digitized in the A/D converter 50. This signal is then analyzed by the processor 52 to determine if any ripple in the signal exists. Ripple in this case is used to describe any small residual variations in the detected signal, since the calibration method actually fixes only N points or pixels neighborhoods over the total number of pixels of the CCD. In the source design, N, which is the number of LEDs, should be sufficient to get a sufficient uniformity. Most of the time, this is directly achievable, since for the most of the LEDs the function giving the relative intensity vs. angular displacement off-axis has smooth variations. However, if this is not sufficient, for each pixel k of the CCD, the processor calculates the ratio $V_{Ref}/V_k$, which characterizes the deviation from the perfect flat/uniform response. So, at step 84 the reference value $V_{ref}$ is retreived. At step 86 the ratio $V_{ref}/V_k$ is calculated for each pixel or group of pixels. The processor 52 then generates and saves these values at step 88 that could be used to slightly adjust the sensitivity of the CCD array, as indicated at step 90 of FIG. 13. The accuracy and the performance of this calibration system provides for added functionality, such as LED failure detection and compensation, or thermal compensation of the LED array for high luminosity sources. Also, if the acquisition system between the target 12 and the processing 52 is perfectly linear and uniform by itself, then the target itself is uniformly illuminated.

FIG. 14 is a flow diagram illustrating the steps for normal operation of the system. FIG. 14 indicates the operation steps 92 for operating the device of the present invention. At step 94 a scan synchronization signal 28 is transmitted by the CCD sequencer 27 to start the scan operation. A counter within the sequencer 56, clocked by a high frequency clock 29 is cleared at step 96. Usually, the high frequency clock 29 is derived from the pixel clock of the CCD, and can be either a multiple or a sub-multiple of this clock, depending on the desired accuracy in the intensity control, but can be independent and asynchronous. At step 98, the sequencer 56 uses the corrected intensity control data to switch off the driver. As disclosed above, the corrected intensity control matrix 46 is calculated by the processor 52. The driver intensity control data is then used by the sequencer 56 to determine the length of the pulse width (i.e., the number of clock pulses of clock 29) for driving each of the elements of the LED array 10. The N LEDs in the array could be turned on simultaneously. However, an improvement and to reduce the electromagnetic interference and noise generated by switching a rather high current simultaneously in all the power drivers for the LEDs simultaneously, the sequencer 56 sequentially turns on the LEDs, such that only one LED is switched on or off during the scan period, while maximizing the overlap of the lighting of the set of LEDs. To sequentially turn on the LEDs, different start & stop clock counts are calculated by the processor 52 for each LED, while respecting the calculated pulsewidth required for each individual LED. At step 102 the counter counts the clock signals. The clock signals are then compared in comparators in the sequencer 56 with the start and stop counts for each LED at step 102. At step 106, driver signals are generated in response to the output of the comparator to active and deactivate the LED drivers.

Figure 15:
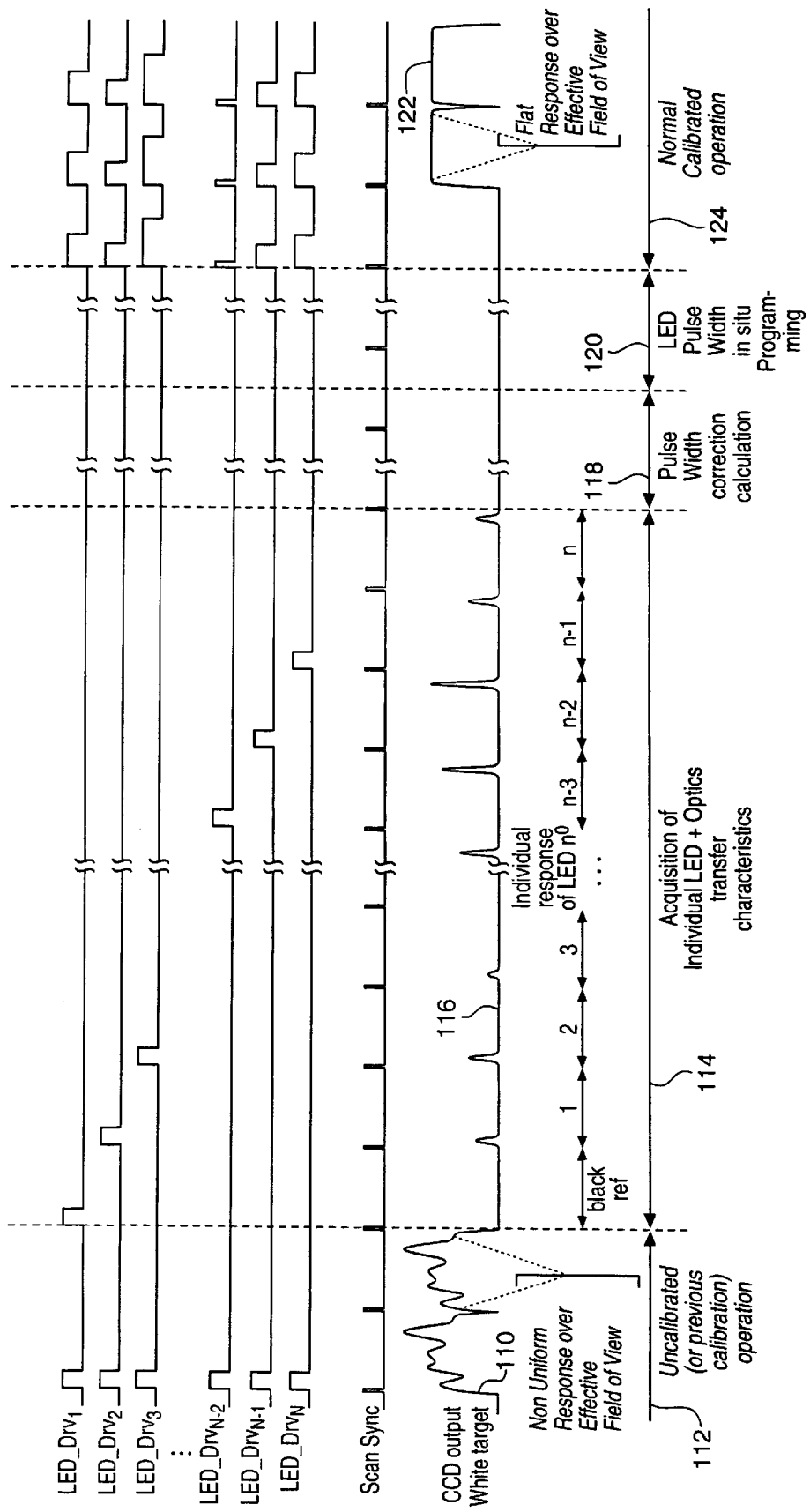
FIG. 15 illustrates the overall timing diagram of one representative implementation of the present invention.

FIG. 15 is a graph that illustrates, by a timing diagram the calibration phase 60 and the normal operation phase 92 before and after calibration, and shows the signals involved at light source sequencer level and at CCD output. FIG. 15 shows a nonuniform response 110 over an effective field of view during an uncalibrated or previously calibrated operation period 112. FIG. 15 also shows the aquisition of responses for individual LEDs and optics transfer characteristics during period 114, as well as the period 118 of pulsewidth correction calculation and the period 120 of LED pulsewidth in situ programming. The flat response 122 over the effective field of view is shown for the normal calibration operation period 124.

Figure 16:
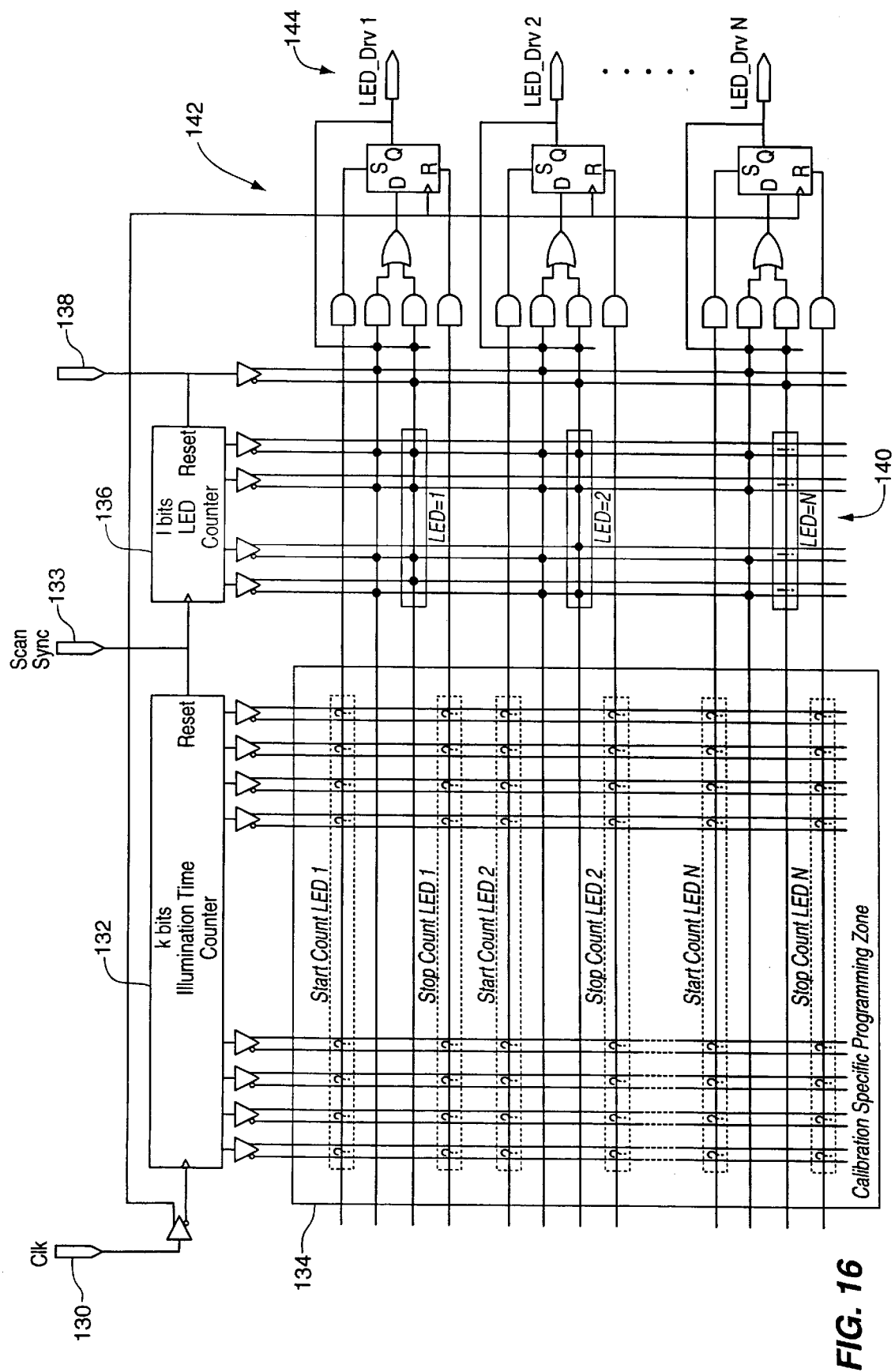
FIG. 16 illustrates a programmable logic device for implementation of the light source control sequencer, highlighting the ease of implementation in standard programmable logic devices.

FIG. 16 shows a typical implementation that highlights the straightforward manner of using a standard CPLD structure, taking advantage of the programmable wired-AND to set and reset each driver Flip Flop at a certain value of the time counter. The rest of the logic is fixed and implements both calibration and normal run functions. The driver signals are then applied to power drivers 58 which individually switch on/off each element of the LED array 10 so that the CCD array 24 senses the illuminated object 12 having a uniform intensity, although the real radiometric intensity on the target 12 is not really uniform, since some defects can occur after reflection on the target 12.

As shown in FIG. 16, clock 130 is a high frequency clock that has a clock rate that usually corresponds to the pixel rate or some multiple, or sub-multiple of the pixel rate, if higher or lower pulse width resolution is required. Clock 130 is coupled to and drives the illumination time counter 132 and the flip-flop clocks for the flip-flops contained within the macrocell 142. The illumination time counter 132 is a k-bit binary counter. The pulse width of the illumination time counter 132 is $2^k$. Scan sync signal 133 is used to reset counter 132 and functions as the counter for LED counter 136. LED counter 136 receives the clock signal from scan sync 133 and is used for counting the LEDs from 1 to N for calibration. Control signal 138, as illustrated in FIG. 16, functions to reset the LED counter 136 and thereby ensure that all of the LEDs are simultaneously lit during the pulse-width that is programmed for each of the LEDs during normal run mode. During calibration mode, the control signal 138 causes each of the LEDs to be sequentially lit, as indicated above. Macrocell 142, as illustrated in FIG. 16, is a representation of a standard macrocell configured as a D flip-flop for driving the LED drivers 144. The flip-flops of the macrocell 142 are set by the start count provided by illumination time counter 132 for each LED, and are reset by the stop count provided by illumination time counter 132. Each of the boxes 140 illustrates the connection for each LED that is activated by the LED counter 136. Section 134 of the CPLD illustrated in FIG. 16 is the programmable portion of the chip. Section 134 can be dymanically programmed to set the start and stop count for each LED.

The present invention therefore provides a system that is capable of illuminating a target using an array of optical elements such that the illuminated image is dectected as uniformly illuminated across the surface of the target. This reduces the cost of optics that are required to image the signal. Additionally, the calibration can be performed in one simple and very accurate step.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and practical applications of the invention to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of calibrating an array of light sources to provide a substantially uniform output over a predetermined area comprising:

positioning said array of light sources and an associated detector in front of a reference target;

separately sampling light intensity over said predetermined area for each light source to generate a plurality of intensity signals;

normalizing each of said plurality of intensity signals;

using said normalized intensity signals to determine corrected driver intensity control data; and using said corrected driver intensity control data to generate calibrated driver signals.

2. A method of calibrating an array of light sources to provide a substantially uniform output over a predetermined area comprising:

positioning said array of light sources and an associated detector in front of a reference target;

sampling light intensity over said predetermined area for each light source to generate a plurality of intensity signals;

normalizing said plurality of intensity signals;

using said normalized intensity signals to determine corrected driver intensity control data, wherein said step of using said normalized intensity signals to determine corrected driver intensity control data further comprises:

multiplying an inverted matrix by a linear unity matrix to generate a linear corrected matrix; and generating a pulsewidth count for each light source based upon said linear corrected matrix; and using said corrected driver intensity control data to generate calibrated driver signals.

3. The method of claim 2 further comprising:

generating a start and stop counts for each light source to stagger times and provide proper pulse width.

4. A method of calibrating an array of light sources to provide a substantially uniform output over a predetermined area comprising:

positioning said array of light sources and an associated detector in front of a reference target;

sampling light intensity over said predetermined area for each light source to generate a plurality of intensity signals;

normalizing said plurality of intensity signals;

using said normalized intensity signals to determine corrected driver intensity control data;

using said corrected driver intensity control data to generate calibrated driver signals;

illuminating the said reference target by applying said calibrated driver signals to said array of light sources;

generating a signal that indicates residual variations in a detected signal; and adjusting sensitivity of said detector with said signal.

5. A light source that includes an array of light elements that are calibrated to provide a substantially uniform intensity over a spatial region, said array of light elements being calibrated by:

sampling light intensity over said spatial region for each light element to generate a plurality of intensity signals;

normalizing each of said plurality of intensity signals;

determining corrected driver intensity control data from said normalized intensity signals; and using said corrected driver intensity control data to generate calibrated driver signals.

* * * * *